US012662249B2

(12) United States Patent
Tresch

(10) Patent No.: US 12,662,249 B2
(45) Date of Patent: Jun. 23, 2026

(54) RIGID TUBE STABILIZER SYSTEM FOR PARACHUTE DEPLOYMENT

(71) Applicant: ARIZONA BOARD OF REGENTS ON BEHALF OF THE UNIVERSITY OF ARIZONA, Tucson, AZ (US)

(72) Inventor: Trent Tresch, Oracle, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 0 days.

(21) Appl. No.: 19/252,365

(22) Filed: Jun. 27, 2025

(65) Prior Publication Data

US 2026/0001650 A1      Jan. 1, 2026

Related U.S. Application Data

(60) Provisional application No. 63/664,934, filed on Jun. 27, 2024.

(51) Int. Cl.
*B64D 17/76*          (2006.01)
*B64D 17/24*          (2006.01)
(Continued)

(52) U.S. Cl.
CPC ............. *B64D 17/76* (2013.01); *B64D 17/24* (2013.01); *B64D 17/52* (2013.01); *B64D 17/62* (2013.01); *B64D 17/64* (2013.01)

(58) Field of Classification Search
CPC ........ B64D 17/24; B64D 17/48; B64D 17/50; B64D 17/52; B64D 17/62; B64D 17/64; B64D 17/74; B64D 17/76
See application file for complete search history.

(56) References Cited

U.S. PATENT DOCUMENTS 5,239,927 A * 8/1993 Frye ........................ F42B 10/48
                                                                102/340
9,889,941 B1 * 2/2018 Erickson ................ B64D 17/72
(Continued)

FOREIGN PATENT DOCUMENTS

FR            2752215 A1 * 2/1998    ............. B64B 1/48
JP        10203491 A  * 8/1998    ............. B64D 17/72

*Primary Examiner* — Richard Green
(74) *Attorney, Agent, or Firm* — NGUYEN TARBET IP LAW

(57)          ABSTRACT

A stabilizing parachute system with entanglement prevention capabilities for safely deploying a load from a high-altitude craft. The system includes an expandable container component coupled to the load, a strap coupled to the expandable container component, and a stabilizing parachute disposed within the expandable container component and coupled to the strap. The system further includes an actuation component coupled to the stabilizing parachute, configured to deploy the stabilizing parachute from the expandable container component upon actuation. Upon deployment, the stabilizing parachute is configured to apply tension to the strap that is transferred to the expandable container component. Upon receiving tension from the strap, the expandable container component is configured to expand into a rigid support component configured to surround the strap.

20 Claims, 8 Drawing Sheets

(51) Int. Cl.
    *B64D 17/52*         (2006.01)
    *B64D 17/62*         (2006.01)
    *B64D 17/64*         (2006.01)

(56)             References Cited

U.S. PATENT DOCUMENTS

| | | | | |
|---|---|---|---|---|
| 10,167,072 | B2 * | 1/2019 | Scott | B64D 17/68 |
| 11,326,862 | B2 * | 5/2022 | Trouillot | B64D 17/76 |
| 2019/0344897 | A1 * | 11/2019 | Reasner | B64D 17/24 |

* cited by examiner

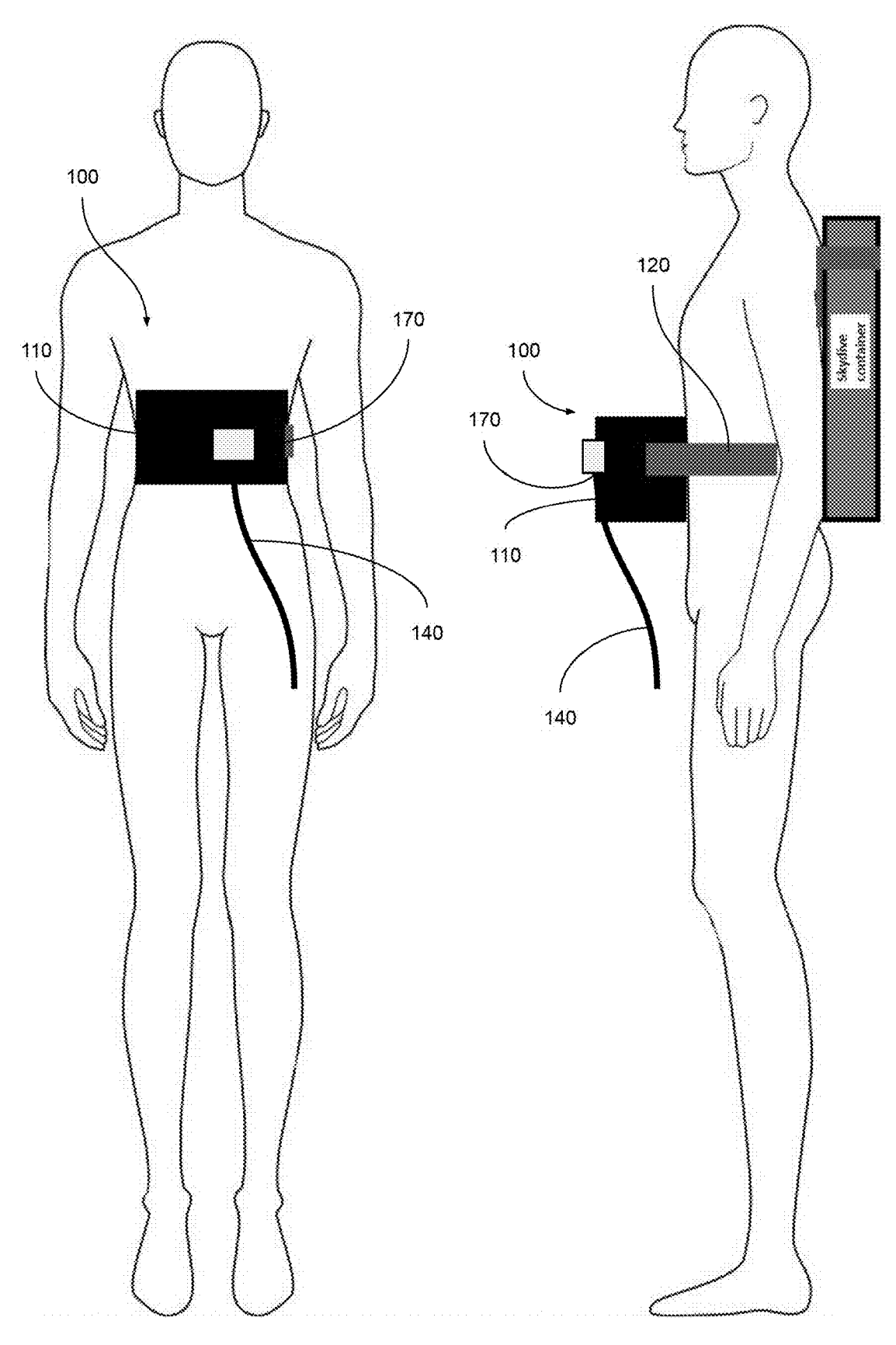
FIG. 1A          FIG. 1B

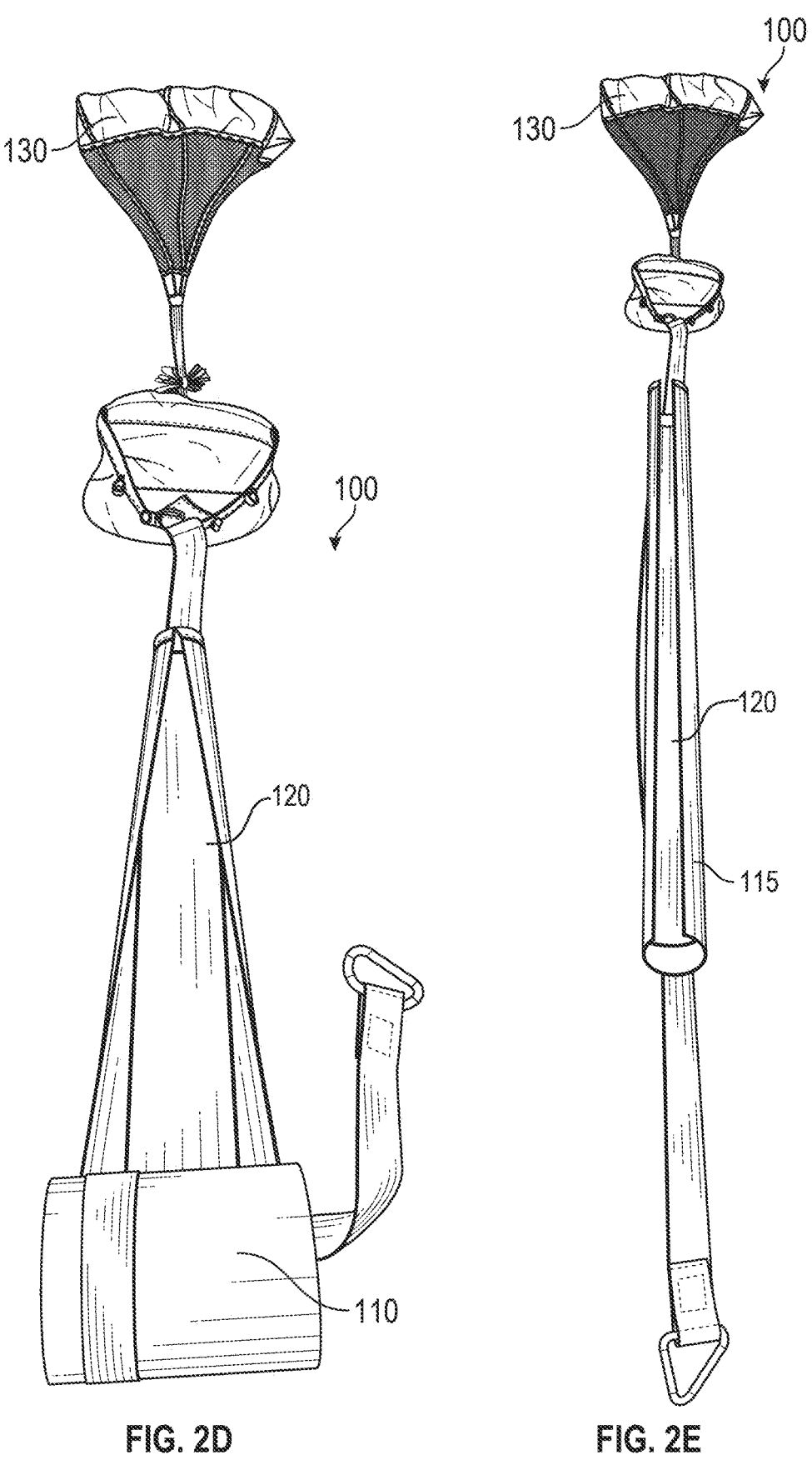
FIG. 2D          FIG. 2E

RIGID TUBE STABILIZER SYSTEM FOR PARACHUTE DEPLOYMENT

CROSS-REFERENCE TO RELATED APPLICATIONS

This application is a non-provisional and claims benefit of U.S. Provisional Application No. 63/664,934 filed Jun. 27, 2024, the specification of which is incorporated herein in their entirety by reference.

FIELD OF THE INVENTION

The present invention is directed to the prevention of the entanglement of cords in a parachute deployment system.

BACKGROUND OF THE INVENTION

When unmanned cargo, gear, or skydivers are dropped from any altitude, there is a potential of entanglement. An entanglement malfunction disallows the main parachute to deploy appropriately and provide a soft landing for gear or people, which can lead to catastrophe. At near-space altitudes or lower-density atmospheres of other planets, this becomes a huge safety concern. Less dense molecules in an atmosphere disallow proper inflation of stabilization drogue parachutes.

Current procedures for preventing the entanglement of parachute cords during deployment involve rigorous training for the users. Their body must be fully stabilized at the time of deployment, which is about 5 to 10 seconds after jumping. This only gives the user a short window to stabilize their body before they have to deploy the drogue parachute. For unmanned drops (e.g. cargo drops), there is little that can be done to prevent entanglement and failures often occur depending on the weather conditions. Cargo drop failures can result in damage to goods and injury or potentially death to humans that the cargo collides with when it hits the ground. Thus, there exists a present need for a device capable of actively preventing the entanglement of parachute cords for both manned and unmanned drops.

BRIEF SUMMARY OF THE INVENTION

It is an objective of the present invention to provide devices and systems that allow for the prevention of entanglement of cords in a parachute deployment system, as specified in the independent claims. Embodiments of the invention are given in the dependent claims. Embodiments of the present invention can be freely combined with each other if they are not mutually exclusive.

The present invention features a stabilizing parachute system with entanglement prevention capabilities for safely deploying a load from a high-altitude craft. The system may comprise an expandable container component configured to be coupled to the load. The system may further comprise an extension strap operatively coupled to the expandable container component. The system may further comprise a stabilizing parachute disposed within the expandable container component, operatively coupled to the extension strap. The system may further comprise an actuating cord operatively coupled to the stabilizing parachute, configured to deploy the stabilizing parachute from the expandable container component upon actuation of the actuating cord. Upon deployment, the stabilizing parachute may be configured to apply tensile strength to the extension strap such that the extension strap applies tensile strength to the expandable container component. Upon receiving tensile strength from the extension strap, the expandable container component is configured to expand into a rigid tube component configured to surround the extension strap.

One of the unique and inventive technical features of the present invention is the implementation of an expandable container component configured to expand into a rigid support component upon receiving tensile force. Without wishing to limit the invention to any theory or mechanism, it is believed that the technical feature of the present invention advantageously provides for the protection and prevention of tangling, knotting, catching, etc. of the cords of a parachute to ensure the safe descent of a manned or unmanned load. None of the presently known prior references or works have the unique inventive technical feature of the present invention.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The features and advantages of the present invention will become apparent from a consideration of the following detailed description presented in connection with the accompanying drawings in which:

FIG. 1A shows a diagram of a front view of the stabilizing parachute system with entanglement prevention capabilities of the present invention.

FIG. 1B shows a diagram of a side view of the stabilizing parachute system with entanglement prevention of the present invention.

Figure 2A:
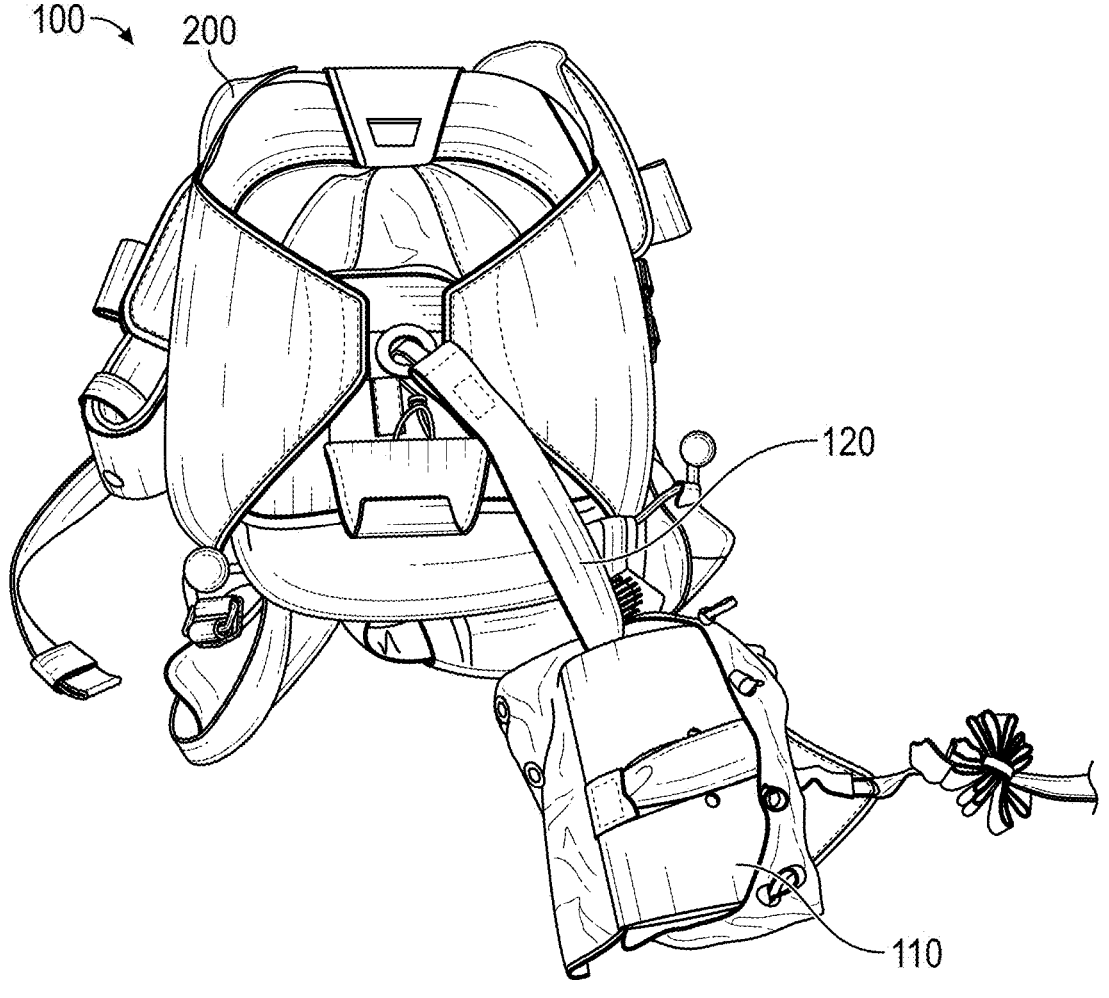
Figures 2B, 2C:
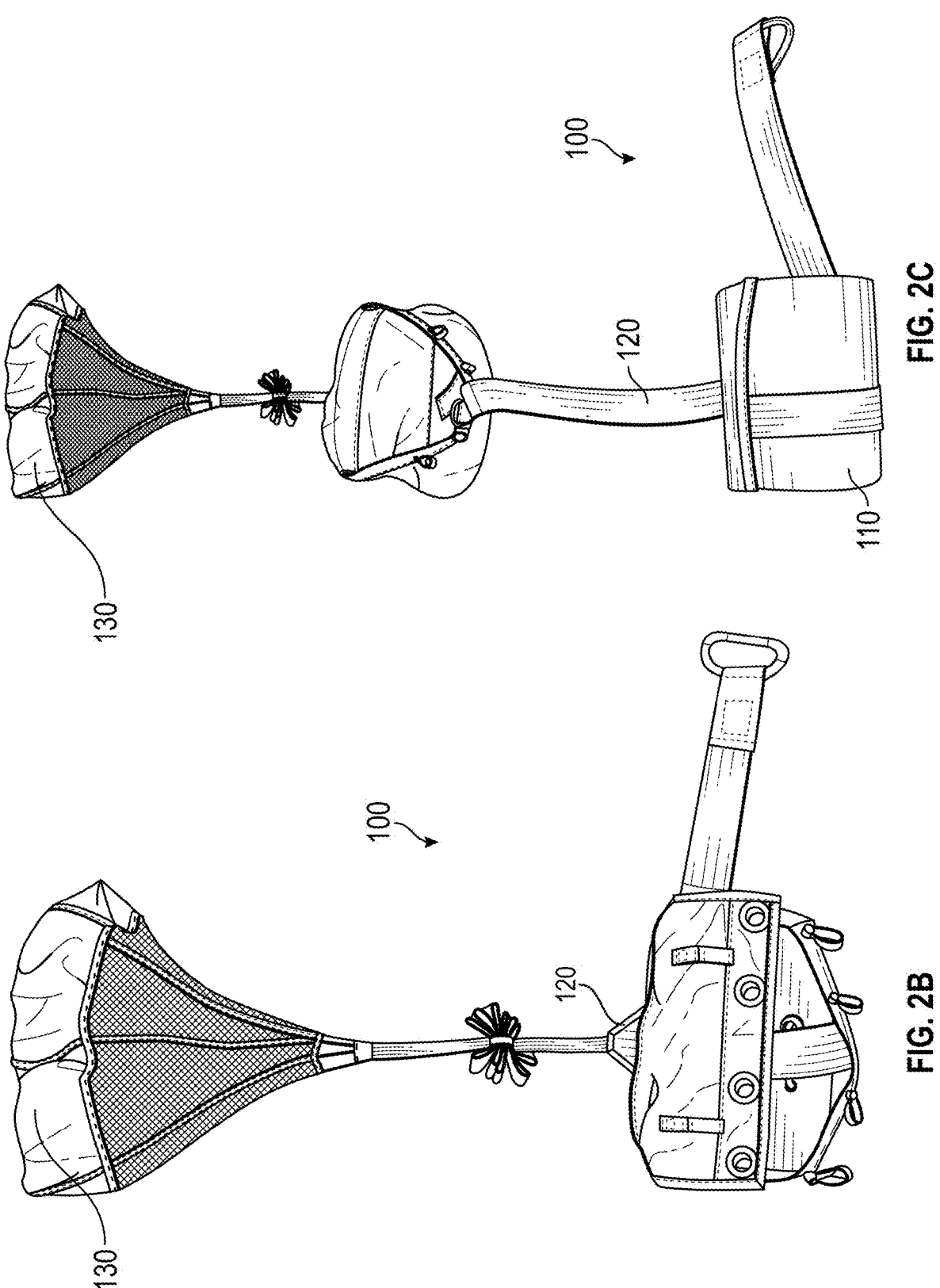

FIGS. 2A-2E show a process of deploying the stabilization parachute with entanglement prevention capabilities of the present invention. FIG. 2A shows the stabilizing parachute system fully compressed and attached to a main parachute container. FIG. 2B shows the stabilizing parachute deployed from the container. FIG. 2C shows the stabilizing parachute extending from the container by an extension strap. FIG. 2D shows the rigid tube forming from the container to contain the extension strap. FIG. 2E shows the rigid tube fully formed around the extension strap to prevent entanglement.

Figure 3:
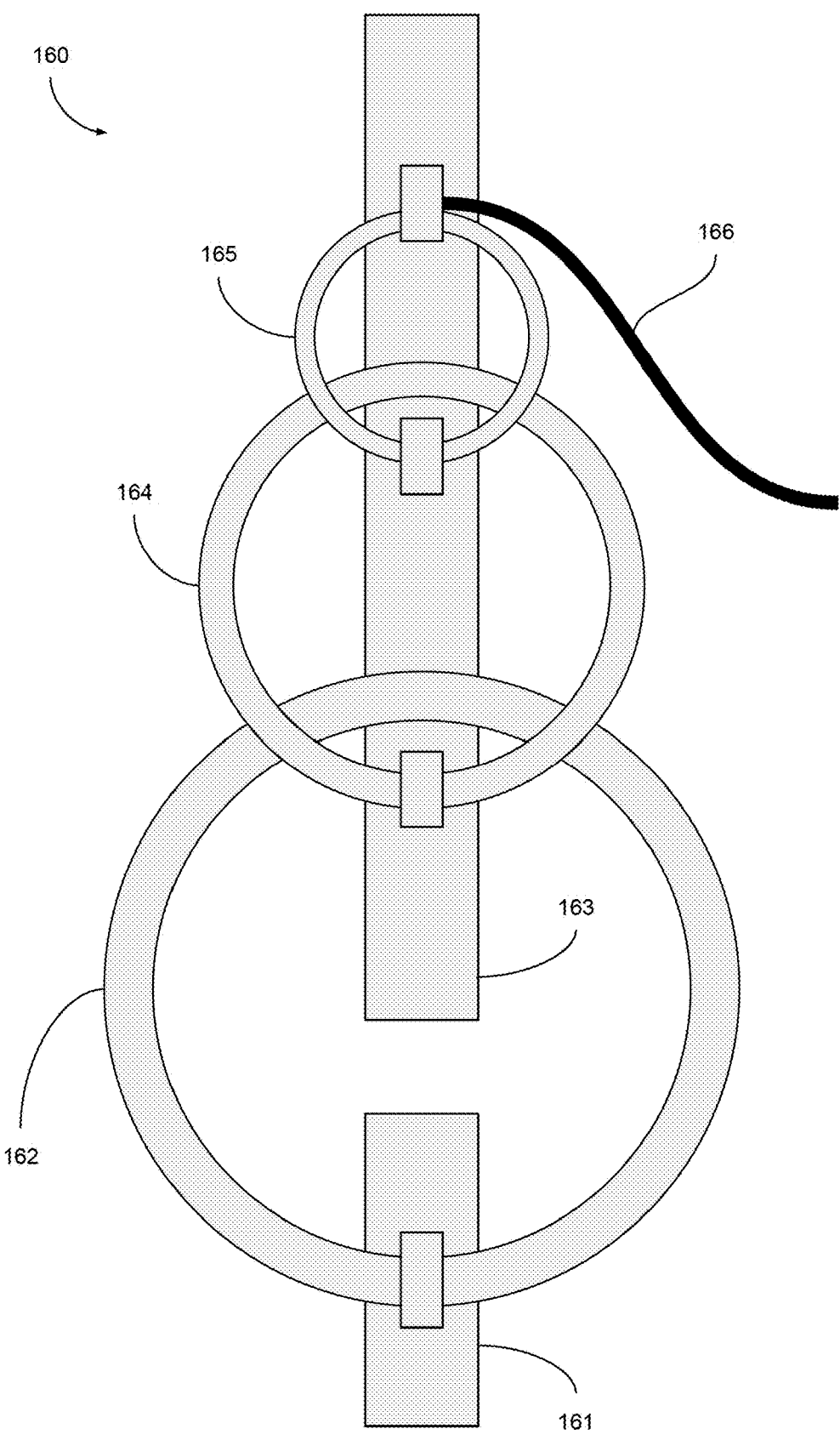

FIG. 3 shows a schematic diagram of the three-ring release mechanism as implemented in the present invention.

Figure 4A:
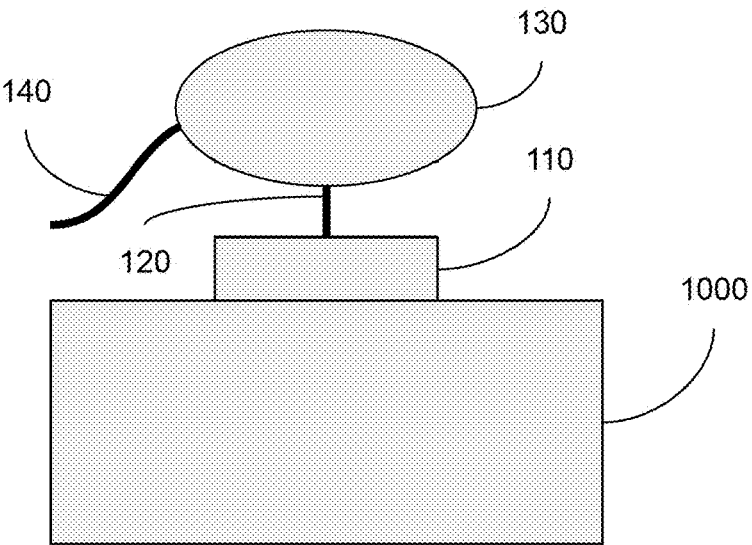

FIG. 4A shows an embodiment of the stabilizing parachute system of the present invention in a non-deployed configuration.

Figure 4B:
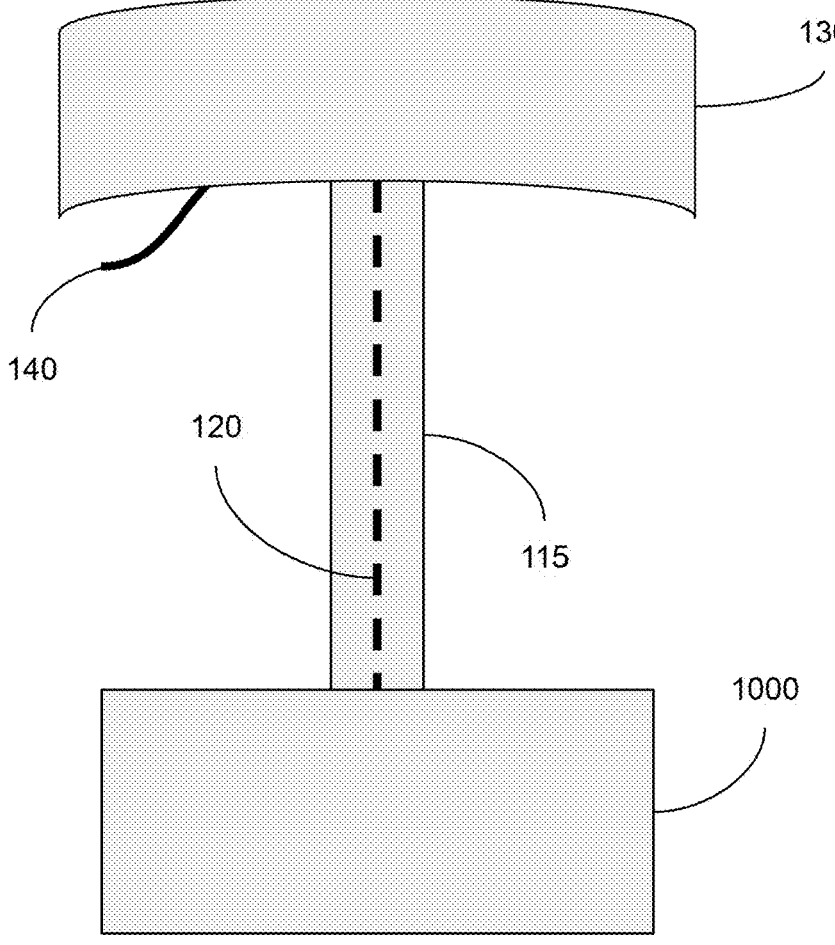

FIG. 4B shows an embodiment of the stabilizing parachute system of the present invention in a deployed configuration.

Figure 5A:
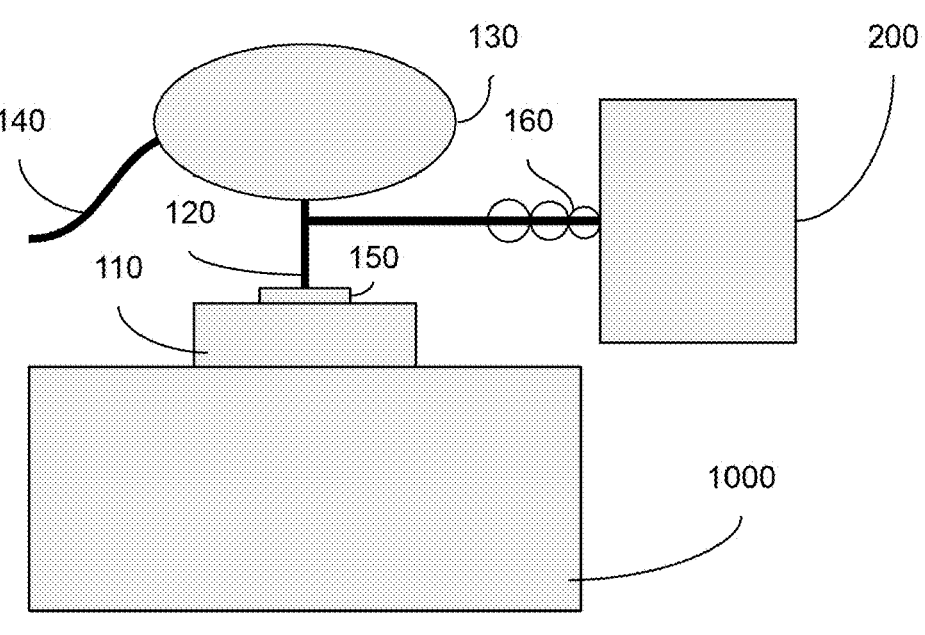

FIG. 5A shows an alternate embodiment of the stabilizing parachute system of the present invention in a non-deployed configuration.

Figure 5B:
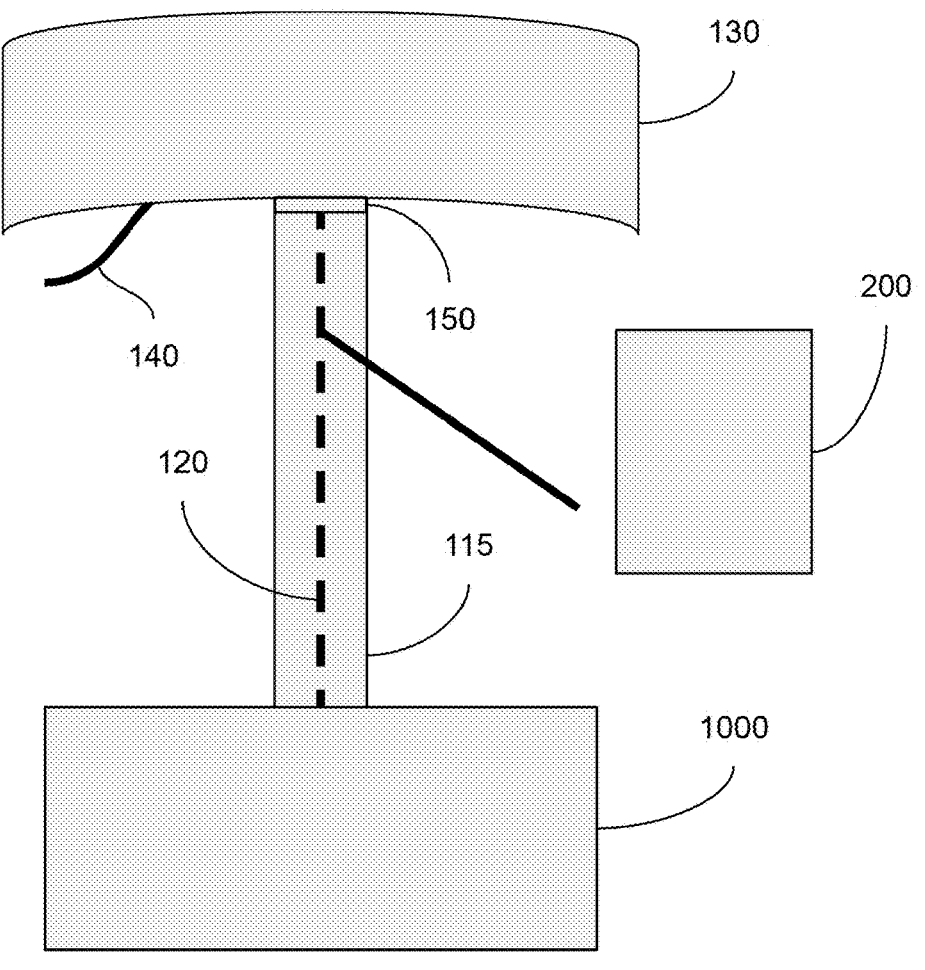

FIG. 5B shows an alternate embodiment of the stabilizing parachute system of the present invention in a deployed configuration.

Figure 6A:
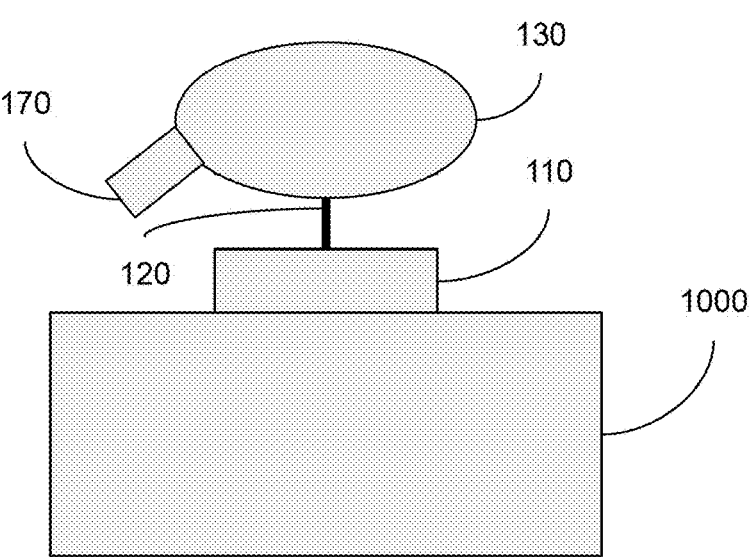

FIG. 6A shows an embodiment of the stabilizing parachute system of the present invention with a ballistic release mechanism in a non-deployed configuration.

Figure 6B:
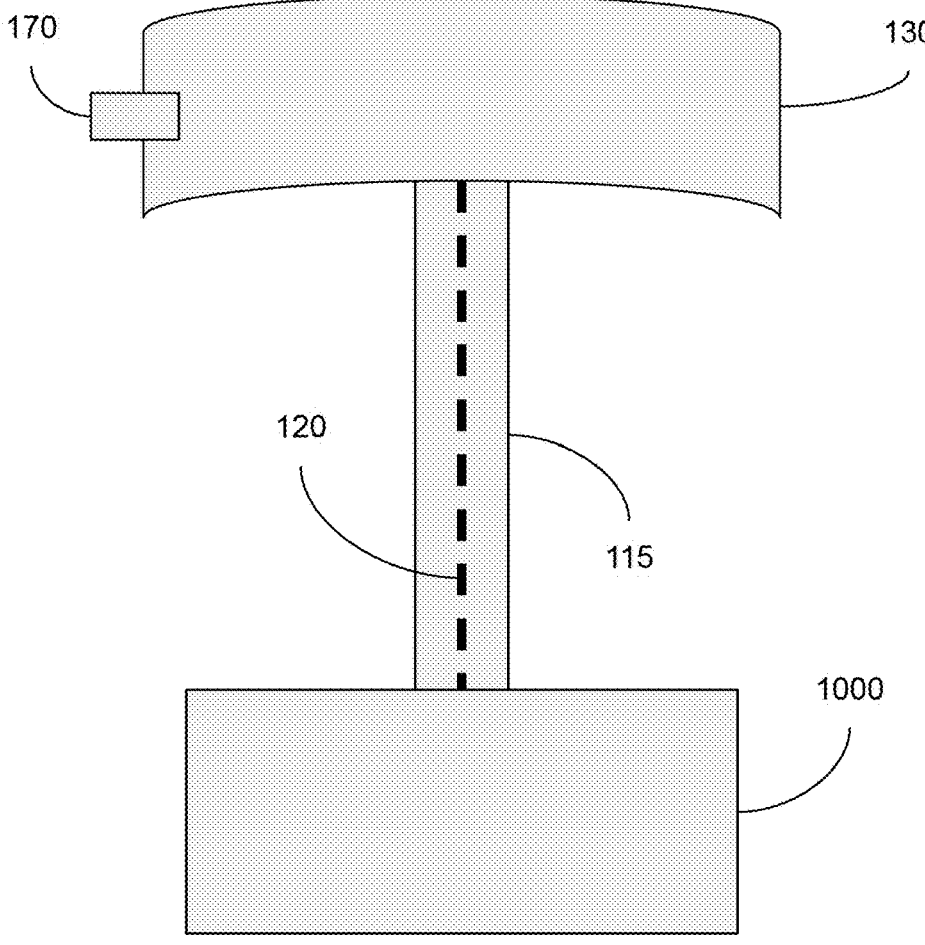

FIG. 6B shows an embodiment of the stabilizing parachute system of the present invention with a ballistic release mechanism in a deployed configuration.

DETAILED DESCRIPTION OF THE INVENTION

Following is a list of elements corresponding to a particular element referred to herein:

100 system
    110 expandable container component
    115 rigid support component
    120 extension strap
    130 stabilizing parachute
    140 actuating cord
    150 coupling ring
    160 three-ring release mechanism
    161 first strap section
    162 first ring
    163 second strap section
    164 second ring
    165 third ring
    166 release cord
    170 ballistic release mechanism
    200 main parachute container
    1000 load Referring now to FIGS. 4A-4B, the present invention features a stabilizing parachute system (100) with entanglement prevention capabilities for safely deploying a load (1000) from an aircraft. In some embodiments, the system (100) may comprise an expandable container component (110) operatively coupled to the load (1000), configured to expand into a rigid support component (115) upon receiving a tensile force. The system (100) may further comprise a coupling component (120) operatively coupled to the expandable container component (110). The system (100) may further comprise a stabilizing parachute (130) disposed within the expandable container component (110), operatively coupled to the coupling component (120). The system (100) may further comprise an actuation component (140) operatively coupled to the stabilizing parachute (130), configured to deploy the stabilizing parachute (130) from the expandable container component (110) upon actuation of the actuating component (140). Upon deployment, the stabilizing parachute (130) may be configured to apply the tensile force to the coupling component (120) such that the coupling component (120) applies the tensile force to the expandable container component (110). Upon receiving tension from the coupling component (120), the expandable container component (110) may be configured to expand into the rigid support component (115), configured to at least partially surround the coupling component (120).

Referring again to FIGS. 4A-4B, the present invention features a stabilizing parachute system (100) with entanglement prevention capabilities for safely deploying a load (1000) from a high-altitude craft. In some embodiments, the system (100) may comprise an expandable container component (110) configured to be coupled to the load (1000). The system (100) may further comprise an extension strap (120) operatively coupled to the expandable container component (110). The system (100) may further comprise a stabilizing parachute (130) disposed within the expandable container component (110), operatively coupled to the extension strap (120). The system (100) may further comprise an actuating cord (140) operatively coupled to the stabilizing parachute (130), configured to deploy the stabilizing parachute (130) from the expandable container component (110) upon actuation of the actuating cord (140). Upon deployment, the stabilizing parachute (130) may be configured to apply tension to the extension strap (120) such that the extension strap (120) applies tension to the expandable container component (110). Upon receiving tension from the extension strap (120), the expandable container component (110) is configured to expand into a rigid tube component (115) configured to surround the extension strap (120).

In some embodiments, the system (100) may further comprise a coupling ring (150) disposed on the extension strap (120), configured to couple the extension strap (120) to the expandable container component (110). The expandable container component (110) may be configured to expand from the coupling ring (150). A shape of the coupling ring (150) may define a shape of a radial cross-section of the rigid tube component (115).

In some embodiments, the extension strap (120) may have a proximal end and a distal end. The distal end of the extension strap (120) may be configured to attach to the stabilizing parachute (130). The proximal end of the extension strap (120) may be configured to attach to a main parachute container (200). In some embodiments, the main parachute container (200) may comprise a main container having a lower portion and an upper portion, a main parachute disposed in the lower portion of the main container, and a reserve parachute disposed in the upper portion of the main container. In some embodiments, the proximal end of the extension strap (120) may be configured to attach to the lower portion of the main parachute container (200) in line with the main parachute. In other embodiments, the proximal end of the extension strap (120) may be configured to attach to the upper portion of the main parachute container (200) above the reserve parachute.

In some embodiments, the proximal end of the extension strap (120) may be attached to the main parachute container (200) by a three-ring release mechanism (160). In some embodiments, the three-ring release mechanism (160) may comprise a first strap section (161) operatively coupled to the extension strap (120). The three-ring release mechanism (160) may further comprise a first ring (162) operatively coupled to the first strap section (161), the first ring (162) having an inner diameter. The three-ring release mechanism (160) may further comprise a second strap section (163) operatively coupled to the main parachute container (200). The three-ring release mechanism (160) may further comprise a second ring (164) operatively coupled to the second strap section (163) such that the second ring (164) is looped through the first ring (162), the second ring (164) having an inner diameter and an outer diameter. The outer diameter of the second ring (164) may be less than the inner diameter of the first ring (162). The three-ring release mechanism (160) may further comprise a third ring (165) operatively coupled to the second strap section (163) by a plurality of attachment points such that the third ring (165) is looped through the second ring (164), the third ring (165) having an outer diameter. The outer diameter of the third ring (165) may be less than the inner diameter of the second ring (164).

The three-ring release mechanism (160) may further comprise a release cord (166) operatively coupled to one or more attachment points of the plurality of attachment points, configured to disconnect the one or more attachment points of the plurality of attachment points from the third ring (165) such that the third ring (165) is partially released from the second strap section (163). Partially releasing the third ring (165) from the second strap section (163) may cause the third ring (165) to pass through the second ring (164) such that the third ring (165) unloops from the second ring (164). Unlooping the third ring (165) from the second ring (164) may cause the second ring (164) to pass through the first ring (162) such that the second ring (164) unloops from the first ring (162). Unlooping the second ring (164) from the first ring (162) may cause the first strap section (161) to fully disconnect from the second strap section (163).

In some embodiments, the system (100) may further comprise a ballistic release mechanism (170) operatively coupled to the actuating cord (140), the mechanism comprising a force generator configured to actuate the actuating cord (140) upon actuation, and a wireless receiver component operatively coupled to the force generator, configured to wirelessly receive an actuation signal and actuate, upon receiving the actuation signal, the force generator. In some embodiments, the force generator may comprise a pressurized container, wherein the actuating the pressurized container causes the pressure to be released from the container to actuate the actuating cord (140).

In some embodiments, the load (1000) may comprise an unmanned cargo load. In some embodiments, the load (1000) may comprise one or more humans. In some embodiments, the high-altitude craft may comprise a plane, a helicopter, a balloon, a blimp, or a spacecraft. In some embodiments, the load (1000) may be dropped from any kind of aircraft.

Referring now to FIGS. 5A-5B, the present invention features a stabilizing parachute system (100) with entanglement prevention capabilities, configured to attach to a main parachute container (200) for safely deploying a load (1000) from a high-altitude craft. The system (100) may comprise an expandable container component (110) configured to be coupled to the load (1000). The system (100) may further comprise an extension strap (120) having a proximal end and a distal end. The system (100) may further comprise a three-ring release mechanism (160) operatively coupled to the distal end of the extension strap (120), configured to releasably couple the extension strap (120) to the main parachute container (200). The system (100) may further comprise a coupling ring (150) disposed on the extension strap (120), configured to couple the extension strap (120) to the expandable container component (110).

The system (100) may further comprise a stabilizing parachute (130) disposed within the expandable container component (110), operatively coupled to the distal end of the extension strap (120). The system (100) may further comprise an actuating cord (140) operatively coupled to the stabilizing parachute (130), configured to deploy the stabilizing parachute (130) from the expandable container component (110) upon actuation of the actuating cord (140). Upon deployment, the stabilizing parachute (130) may be configured to apply tensile strength to the extension strap (120) such that the extension strap (120) applies tensile strength to the expandable container component (110). Upon receiving tensile strength from the extension strap (120), the expandable container component (110) may be configured to expand from the coupling ring (150) into a rigid tube component (115) configured to at least partially surround the extension strap (120). A shape of the coupling ring (150) may define a shape of a radial cross-section of the rigid tube component (115).

In some embodiments, the main parachute container (200) may comprise a main container having a lower portion and an upper portion, a main parachute disposed in the lower portion of the main container, and a reserve parachute disposed in the upper portion of the main container. In some embodiments, the proximal end of the extension strap (120)

is configured to attach to the lower portion of the main parachute container (200) in line with the main parachute. In some embodiments, the proximal end of the extension strap (120) may be configured to attach to the upper portion of the main parachute container (200) above the reserve parachute.

In some embodiments, the three-ring release mechanism (160) may comprise a first strap section (161) operatively coupled to the extension strap (120). The three-ring release mechanism (160) may further comprise a first ring (162) operatively coupled to the first strap section (161), the first ring (162) having an inner diameter. The three-ring release mechanism (160) may further comprise a second strap section (163) operatively coupled to the main parachute container (200). The three-ring release mechanism (160) may further comprise a second ring (164) operatively coupled to the second strap section (163) such that the second ring (164) is looped through the first ring (162), the second ring (164) having an inner diameter and an outer diameter. The outer diameter of the second ring (164) may be less than the inner diameter of the first ring (162). The three-ring release mechanism (160) may further comprise a third ring (165) operatively coupled to the second strap section (163) by a plurality of attachment points such that the third ring (165) is looped through the second ring (164), the third ring (165) having an outer diameter. The outer diameter of the third ring (165) may be less than the inner diameter of the second ring (164). The three-ring release mechanism (160) may further comprise a release cord (166) operatively coupled to one or more attachment points of the plurality of attachment points, configured to disconnect the one or more attachment points of the plurality of attachment points from the third ring (165) such that the third ring (165) is partially released from the second strap section (163). Partially releasing the third ring (165) from the second strap section (163) may cause the third ring (165) to pass through the second ring (164) such that the third ring (165) unloops from the second ring (164). Unlooping the third ring (165) from the second ring (164) may cause the second ring (164) to pass through the first ring (162) such that the second ring (164) unloops from the first ring (162). Unlooping the second ring (164) from the first ring (162) may cause the first strap section (161) to fully disconnect from the second strap section (163).

In some embodiments, the system (100) may further comprise a ballistic release mechanism (170) operatively coupled to the actuating cord (140), the mechanism comprising a force generator configured to actuate the actuating cord (140) upon actuation, and a wireless receiver component operatively coupled to the force generator, configured to wirelessly receive an actuation signal and actuate, upon receiving the actuation signal, the force generator. The force generator may comprise a pressurized container. Actuating the pressurized container may cause the pressure to be released from the container to actuate the actuating cord (140). The high-altitude craft may comprise a plane, a helicopter, or a spacecraft.

In some embodiments, the aircraft may comprise a plane, a helicopter, or a spacecraft. In some embodiments, the aircraft may further comprise a high-altitude balloon, a jet, a building, or any structure. In some embodiments, the coupling component (120) of the system (100) of the present invention may comprise one or more straps, one or more cords, one or more chains, or a combination thereof. In some embodiments, the coupling component (120) may comprise any flexible material, any stretchable material, or a combination thereof. For the purposes of this application, the term "flexible" is defined as any material capable of withstanding bending, twisting, or any other similar force applied to it without snapping. For the purposes of this application, the term "stretchable" is defined as capable of being easily stretched and resuming its former size or shape.

In some embodiments, the actuating component (140) of the present invention may comprise a pull cord, a push button, or a combination thereof. In the case of a human user, the actuating component (140) may be positioned such that the user can easily access the actuating component (140) during a high-velocity drop. For example, the actuating component (140) may be disposed on a strap around the user's shoulder, in the middle of the user's abdomen, etc. In the case of an unmanned drop, the actuating component (140) may be fully automated. In some embodiments, the fully automated actuating component may comprise a wireless receiver component (e.g., an antenna and microprocessor unit) configured to receive a remote signal to trigger the actuating component. The remote signal may be received from a transmitter from the ground, from the aircraft, from a control center, etc.

In some embodiments, the rigid support component (115) may be configured to at least partially surround the coupling component (120). In some embodiments, the rigid support component (115) may have a tube shape such that the coupling component (120) is completely surrounded. In other embodiments, the rigid support component (115) may have a helical shape such that the coupling component (120) is partially surrounded to prevent tangling, knotting, catching on the load, etc. In some embodiments, the coupling ring (150) may define the radial cross-section of the rigid support component (115). The radial cross-section of the rigid support component (115) may comprise a circle, a rectangle, or any other polygonal shape. For the purposes of this application, the term "rigid" is defined as resistant to bending and twisting forces while maintaining its shape. In some embodiments, the coupling ring (150) may comprise a completely rigid material (e.g., metal), and the rigid support component (115) may comprise an at least partially rigid multilayered material (i.e., fabric, plastic, etc.). In some embodiments, the tensile force applied to the expandable container component (110) may cause the expandable container component (110) to transform into the rigid support component (115) by unfolding, unrolling, expanding, or a combination thereof.

In some embodiments, the stabilizing parachute system (100) of the present invention may be releasably coupled to a main parachute. However, in some embodiments, the stabilizing parachute system (100) of the present invention may be implemented into the main parachute to achieve the same benefits. In some embodiments, releasing the coupling component (120) from the main parachute container (200) may actuate the main parachute to deploy. The stabilizing parachute system (100) and the main parachute (200) container may both be coupled to the load (1000) to provide multiple parachutes for safe descent. In some embodiments, the stabilizing parachute (130) may be configured to apply the tensile strength to the coupling component (120) through wind resistance.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A stabilizing parachute system (100) with entanglement prevention capabilities for safely deploying a load (1000) from an aircraft, the system (100) comprising:

a) an expandable container component (110) operatively coupled to the load (1000), configured to expand into a rigid support component (115) upon receiving a tensile force;

b) a coupling component (120) operatively coupled to the expandable container component (110);

c) a stabilizing parachute (130) disposed within the expandable container component (110), operatively coupled to the coupling component (120); and d) an actuation component (140) operatively coupled to the stabilizing parachute (130), configured to deploy the stabilizing parachute (130) from the expandable container component (110) upon actuation of the actuating component (140);

wherein, upon deployment, the stabilizing parachute (130) is configured to apply the tensile force to the coupling component (120) such that the coupling component (120) applies the tensile force to the expandable container component (110);

wherein, upon receiving tension from the coupling component (120), the expandable container component (110) is configured to expand into the rigid support component (115) configured to at least partially surround the coupling component (120).

2. A stabilizing parachute system (100) with entanglement prevention capabilities for safely deploying a load (1000) from a high-altitude craft, the system (100) comprising:

a) an expandable container component (110) coupled to the load (1000), configured to expand into a rigid tube component (115) upon receiving a tensile force;

b) an extension strap (120) operatively coupled to the expandable container component (110);

c) a stabilizing parachute (130) disposed within the expandable container component (110), operatively coupled to the extension strap (120); and d) an actuating cord (140) operatively coupled to the stabilizing parachute (130), configured to deploy the stabilizing parachute (130) from the expandable container component (110) upon actuation of the actuating cord (140);

wherein, upon deployment, the stabilizing parachute (130) is configured to apply tension to the extension strap (120) such that the extension strap (120) applies tension to the expandable container component (110);

wherein, upon receiving tension from the extension strap (120), the expandable container component (110) is configured to expand into a rigid tube component (115) configured to at least partially surround the extension strap (120).

3. The system (100) of claim 2 further comprising a coupling ring (150) disposed on the extension strap (120), configured to couple the extension strap (120) to the expandable container component (110), wherein the expandable container component (110) is configured to expand from the coupling ring (150), wherein a shape of the coupling ring (150) defines a shape of a radial cross-section of the rigid tube component (115).

4. The system (100) of claim 2, wherein the extension strap (120) has a proximal end and a distal end, wherein the distal end of the extension strap (120) is configured to attach to the stabilizing parachute (130), wherein the proximal end of the extension strap (120) is configured to attach to a main parachute container (200).

5. The system (100) of claim 4, wherein the main parachute container (200) comprises a main container having a lower portion and an upper portion, a main parachute disposed in the lower portion of the main container, and a reserve parachute disposed in the upper portion of the main container;

wherein the proximal end of the extension strap (120) is configured to attach to the lower portion of the main parachute container (200) in line with the main parachute or to the upper portion of the main parachute container (200) above the reserve parachute.

6. The system (100) of claim 5, wherein the proximal end of the extension strap (120) is attached to the main parachute container (200) by a three-ring release mechanism (160).

7. The system (100) of claim 6, wherein the three-ring release mechanism (160) comprises:

a) a first strap section (161) operatively coupled to the extension strap (120);

b) a first ring (162) operatively coupled to the first strap section (161), the first ring (162) having an inner diameter;

c) a second strap section (163) operatively coupled to the main parachute container (200);

d) a second ring (164) operatively coupled to the second strap section (163) such that the second ring (164) is looped through the first ring (162), the second ring (164) having an inner diameter and an outer diameter, wherein the outer diameter of the second ring (164) is less than the inner diameter of the first ring (162);

e) a third ring (165) operatively coupled to the second strap section (163) by a plurality of attachment points such that the third ring (165) is looped through the second ring (164), the third ring (165) having an outer diameter, wherein the outer diameter of the third ring (165) is less than the inner diameter of the second ring (164); and f) a release cord (166) operatively coupled to one or more attachment points of the plurality of attachment points, configured to disconnect the one or more attachment points of the plurality of attachment points from the third ring (165) such that the third ring (165) is partially released from the second strap section (163);

wherein partially releasing the third ring (165) from the second strap section (163) causes the third ring (165) to pass through the second ring (164) such that the third ring (165) unloops from the second ring (164);

wherein unlooping the third ring (165) from the second ring (164) causes the second ring (164) to pass through the first ring (162) such that the second ring (164) unloops from the first ring (162);

wherein unlooping the second ring (164) from the first ring (162) causes the first strap section (161) to fully disconnect from the second strap section (163).

8. The system (100) of claim 2 further comprising a ballistic release mechanism (170) operatively coupled to the actuating cord (140), the mechanism comprising a force generator configured to actuate the actuating cord (140) upon actuation, and a wireless receiver component operatively coupled to the force generator, configured to wirelessly receive an actuation signal and actuate, upon receiving the actuation signal, the force generator.

9. The system (100) of claim 8, wherein the force generator comprises a pressurized container, wherein the actuating the pressurized container causes the pressure to be released from the container to actuate the actuating cord (140).

10. The system (100) of claim 9, wherein the load (1000) comprises an unmanned cargo load.

11. The system (100) of claim 2, wherein the load (1000) comprises one or more humans.

12. The system (100) of claim 2, wherein the high-altitude craft comprises a plane, a helicopter, a balloon, a blimp, or a spacecraft.

13. A stabilizing parachute system (100) with entanglement prevention capabilities, configured to attach to a main parachute container (200) for safely deploying a load (1000) from a high-altitude craft, the system (100) comprising:

a) an expandable container component (110) configured to be coupled to the load (1000);

b) an extension strap (120) having a proximal end and a distal end;

c) a three-ring release mechanism (160) operatively coupled to the distal end of the extension strap (120), configured to releasably couple the extension strap (120) to the main parachute container (200);

d) a coupling ring (150) disposed on the extension strap (120), configured to couple the extension strap (120) to the expandable container component (110);

e) a stabilizing parachute (130) disposed within the expandable container component (110), operatively coupled to the distal end of the extension strap (120); and f) an actuating cord (140) operatively coupled to the stabilizing parachute (130), configured to deploy the stabilizing parachute (130) from the expandable container component (110) upon actuation of the actuating cord (140);

wherein, upon deployment, the stabilizing parachute (130) is configured to apply tension to the extension strap (120) such that the extension strap (120) applies tension to the expandable container component (110);

wherein, upon receiving tension from the extension strap (120), the expandable container component (110) is configured to expand from the coupling ring (150) into a rigid tube component (115) configured to at least partially surround the extension strap (120);

wherein a shape of the coupling ring (150) defines a shape of a radial cross-section of the rigid tube component (115).

14. The system (100) of claim 13, wherein the main parachute container (200) comprises a main container having a lower portion and an upper portion, a main parachute disposed in the lower portion of the main container, and a reserve parachute disposed in the upper portion of the main container.

15. The system (100) of claim 14, wherein the proximal end of the extension strap (120) is configured to attach to the lower portion of the main parachute container (200) in line with the main parachute.

16. The system (100) of claim 14, wherein the proximal end of the extension strap (120) is configured to attach to the upper portion of the main parachute container (200) above the reserve parachute.

17. The system (100) of claim 13, wherein the three-ring release mechanism (160) comprises:

a) a first strap section (161) operatively coupled to the extension strap (120);

b) a first ring (162) operatively coupled to the first strap section (161), the first ring (162) having an inner diameter;

c) a second strap section (163) operatively coupled to the main parachute container (200);

d) a second ring (164) operatively coupled to the second strap section (163) such that the second ring (164) is looped through the first ring (162), the second ring (164) having an inner diameter and an outer diameter, wherein the outer diameter of the second ring (164) is less than the inner diameter of the first ring (162);

e) a third ring (165) operatively coupled to the second strap section (163) by a plurality of attachment points such that the third ring (165) is looped through the second ring (164), the third ring (165) having an outer diameter, wherein the outer diameter of the third ring (165) is less than the inner diameter of the second ring (164); and f) a release cord (166) operatively coupled to one or more attachment points of the plurality of attachment points, configured to disconnect the one or more attachment points of the plurality of attachment points from the third ring (165) such that the third ring (165) is partially released from the second strap section (163);

wherein partially releasing the third ring (165) from the second strap section (163) causes the third ring (165) to pass through the second ring (164) such that the third ring (165) unloops from the second ring (164);

wherein unlooping the third ring (165) from the second ring (164) causes the second ring (164) to pass through the first ring (162) such that the second ring (164) unloops from the first ring (162);

wherein unlooping the second ring (164) from the first ring (162) causes the first strap section (161) to fully disconnect from the second strap section (163).

18. The system (100) of claim 13 further comprising a ballistic release mechanism (170) operatively coupled to the actuating cord (140), the mechanism comprising a force generator configured to actuate the actuating cord (140) upon actuation, and a wireless receiver component operatively coupled to the force generator, configured to wirelessly receive an actuation signal and actuate, upon receiving the actuation signal, the force generator.

19. The system (100) of claim 18, wherein the force generator comprises a pressurized container, wherein the actuating the pressurized container causes the pressure to be released from the container to actuate the actuating cord (140).

20. The system (100) of claim 13, wherein the high-altitude craft comprises a plane, a helicopter, or a spacecraft.

\* \* \* \* \*